RELAY DEVICE

Filed Sept. 5, 1956

INVENTOR
CARL GUNNAR SVALA

BY Hane and Nydick
ATTORNEYS

United States Patent Office
2,801,374
Patented July 30, 1957

2,801,374

RELAY DEVICE

Carl Gunnar Svala, Alvsjo, Sweden, assignor to Telefonaktiebolaget L M Ericsson, Stockholm, Sweden, a corporation of Sweden Application September 5, 1956, Serial No. 608,151

Claims priority, application Sweden September 20, 1955

3 Claims. (Cl. 317—155.5)

The present invention refers to a relay device with a very high sensitivity.

Up to now polarized relays and so-called moving coil relays have been used in circuits where relays with a very high sensitivity are required. Said relays are, however, expensive and difficult to adjust so that they work satisfactorily. It is also possible to use electronic flip flop circuits of any kind in order to obtain the desired sensitivity. Electron tube circuits are less desirable particularly for relay circuits which are to be used in automatic telephone systems, as they request special voltage sources and as the life of the electron tubes is limited. In this respect the transistor flip flop circuit is better, but for said circuits special point contact transistors intended for flip flop circuits are to be used, if one single transistor is to be enough. The known circuits of this kind also have a bad stability. A better stability can be obtained with junction transistors, but normally at least two such transistors are required in a flip-flop circuit. A disadvantage of all electronic flip flop circuits is also, that they are equivalent to one working contact only.

The above mentioned disadvantages are avoided by the relay device according to the invention. This device comprises a transistor amplifier, the input of which is connected to the input of the relay device, and an electromagnetic relay. It is characterized by the electromagnetic relay being provided with a main winding which is connected to the output of the amplifier and an auxiliary winding which is connected to the input of the amplifier, the auxiliary winding being arranged in such a way that a positive feed back is obtained from the output to the input of the amplifier, and by a rectifier being connected in series with the auxiliary winding and the input circuit of the transistor amplifier in such a way that the input impedance of the device is high for control signals at the same time as a low impedance is obtained for the feed back current.

The invention will be more closely described in connection with the attached figures.

Fig. 1 of which shows a device according to the invention,

Figure 1:
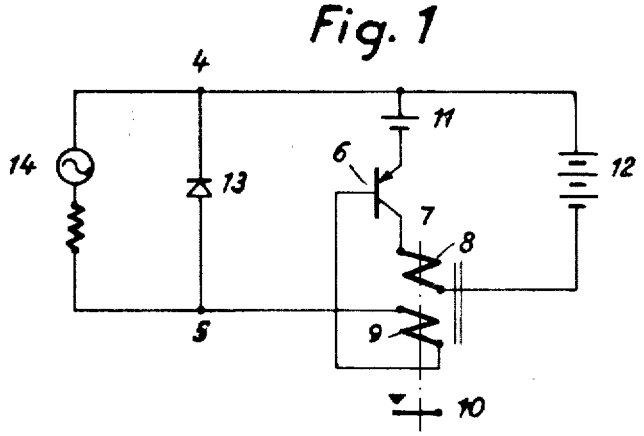

In Fig. 1, the references 4 and 5 designate the input terminals of the amplifier device, 6 a transistor, 7 a relay provided with two windings 8, 9 and a number of working contacts, only one of which, 10, is shown in the Figure. 11 and 12 designate two batteries and 13 a diode which is shunting the input. The control signal source which actuates the relay device, is designated by 14.

The transistor 6 is comprised in a grounded emitter amplifier circuit, the input of which is connected to the input terminals 4, 5 in series with the winding 9 of the relay 7. The output circuit of the transistor is connected to the winding 8 on the relay. The emitter- and the collector biases, respectively, are supplied by the batteries 11 and 12, respectively. The windings 8 and 9 on the relay 7 have such a winding direction that a positive feed back is obtained between the input and the output circuits of the transistor.

The device mainly operates in the following manner: At rest as well the emitter as the collector of the transistor are supplied with a negative bias relatively the base from the batteries 11 and 12, respectively. As the transistor is supposed to be a p–n–p transistor, a locking voltage between the emitter and the base is, thus, obtained and the currents to the electrodes of the transistor are very small, i. e. the input impedance of the transistor is high. When also the rectifier 13 which is connected in parallel with the input circuit of the transistor is blocked, the input impedance of the relay device for control signals will be high. If a control signal voltage is applied to the input terminals 4, 5 of the relay device, said control signal voltage being so directed that the rectifier 13 remains locked and so high that the negative emitter bias voltage is overcome, current begins to flow in the input circuit of the transistor. This current is amplified by the transistor and said amplified current flows through the collector and the relay winding 8. The change in current in the relay winding 8 which is an actuating winding causes an induced voltage in the relay winding 9, which is a feed back winding, and said voltage causes another increase of the current through the relay winding 8 etc. in a cumulative course. The effect required for starting said course is particularly small. The increase of the collector current is, however, limited by the properties of the relay windings 8, 9 and of the transistor 6. At a certain moment the feed back ceases, the current through the relay winding 8 also decreasing quickly in a cumulative course. The relay must have operated before said moment in order to make the relay device work in the desired way, and this must be taken into consideration when the circuit is dimensioned. A particularly safe function is obtained, if the relay is made in the way described in connection with Fig. 3 and if the feed back winding 9 is shunted with a low impedance during the actuation course of the relay, said low impedance consisting of the forward resistance of the rectifier 13 and the input impedance of the transistor. According to Lenz' law the magnetic resistance of the magnetic circuit which is surrounded by the practically short circuited feed-back winding is very great at the beginning and then decreases rather slowly. The flux of the actuating winding 8 must therefore partly be closed outside the feed back winding 9, i. e. a leakage flux arises. As the current in the feed back winding 9 gradually increases, the leakage flux will decrease more and more and the flux through the feed back winding increases correspondingly. The increase of the flux through the feed back winding 9 can, thus, continue even after the ceasing of the increase of the flux in the feed back winding, and as the induced voltage in the feed back winding is proportional to the change in flux the positive feed back can continue even after the maximum of the actuation current has been reached. At the same time also the time available for the actuation of the relay increases.

Figure 2:
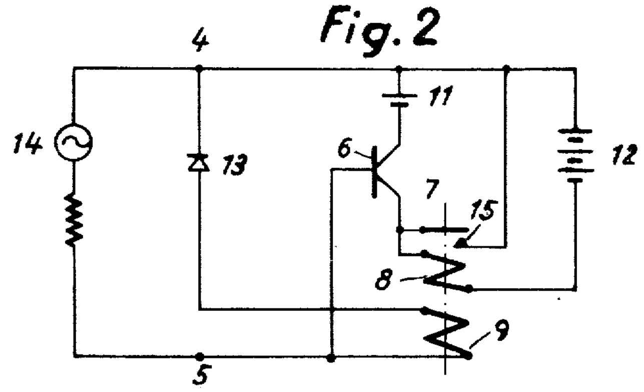
Fig. 2 shows a variation of the device according to Fig. 1.

Fig. 2 shows a modification of the circuit according to Fig. 1. The signal source 14 is over the input terminal 5 connected directly to the base electrode of the transistor, whereas the feed back winding 8 of the relay in series with the amplifier 13 is connected in parallel with the input circuit of the transistor. The relay 7 is also provided with a locking contact 15 which upon operation of the relay closes a lock-up circuit comprising the battery 12, the relay winding 8 and the contact 15. The output circuit of the transistor is however short circuited. The relay remains energized until the lock-up circuit is broken by an outer means.

Figure 3:
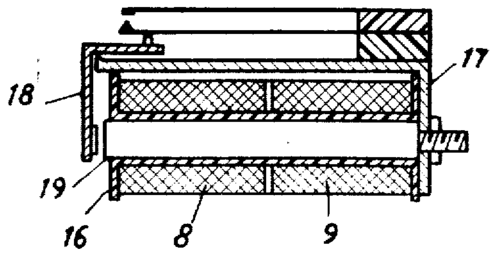
Fig. 3 shows the arrangement of the windings on a relay which is used in the device according to the invention.

In order to obtain a quick actuation of the relay, while the feed back is still effective, it is suitable to arrange the two relay windings in a particular way, as shown in Fig. 3. The relay winding 8, the actuation winding, is arranged on that part of the coil bobbin which is situated next to the armature 18, whereas the feed back winding 9 is arranged on the part of the coil bobbin facing the armature. The core of the relay is designated by 19 in the figure, the yoke being designated by 17.

Owing to the low input impedance of the transistor, after that the regenerated course has started, and to the low impedance in the pass direction of the amplifier, the feed back winding is practically short circuited, and, therefore, the magnetic flow through said winding can only increase slowly. The magnetic circuit of the relay is so designed that the winding 8 has a considerable leakage flux, which passes the armature circuit but not the winding 9. Owing to this the flux in the armature circuit can increase quickly, so that a quick actuation can be obtained, while the flow through the feed back winding owing to the low resistance will increase more slowly and will continue increasing also after that the flow through the winding 8 has approached its maximum. The relay then certainly has time to operate before the feed back ceases.

A relay device according to the invention has been operated with control signals having a power in the order of one micro watt or less, said device comprising a junction transistor of normal kind and a general purpose telephone relay. Such a high sensitivity is, however, less suitable for practical use, as false actuations may arise owing to weak disturbance voltages. The sensitivity of the relay device can, however, easily be varied by changing the bias voltage (the battery 11) of the emitter.

Of course the invention is not limited to the above embodiments but may be modified in many ways within the scope of the invention. For instance, the p–n–p type transistor shown in the figure, may be replaced by a transistor of n–p–n type, necessitating some changes of the bias sources etc.

I claim:

1. A relay device comprising a transistor amplifier, the input of which is connected to the input of the relay device, and an electro-magnetic relay, characterized by the electro-magnetic relay being provided with a main winding which is connected to the output of the amplifier and with an auxiliary winding which is connected to the input of the transistor, the auxiliary winding being arranged in such a way that a positive feed back is obtained from the output to the input of the amplifier, and by a rectifier being connected in series with the auxiliary winding and the input circuit of the transistor in such a way that the input impedance of the device is high for control signals at the same time as a low impedance is obtained for the feed back current.

2. A relay device according to claim 1, characterized by the windings of the relay being arranged on the coil bobbin of the relay in relation to each other in such a way that the main winding is situated next to the armature, so that the leakage flux of the main winding mainly flows through the armature.

3. A relay device according to claim 1, characterized by a locking contact on the relay, which, when the relay is operated, connects the main winding directly to a voltage source.

References Cited in the file of this patent

UNITED STATES PATENTS 2,759,111 Wideroe ---------------- Aug. 14, 1956

Notice of Adverse Decision in Interference

In Interference No. 89,618 involving Patent No. 2,801,374, C. G. Svala, Relay device, final judgment adverse to the patentee was rendered March 10, 1961, as to claim 1.

[*Official Gazette May 2, 1961.*]